(12) United States Patent
Lowles et al.

(10) Patent No.: US 7,800,596 B2
(45) Date of Patent: Sep. 21, 2010

(54) HANDHELD ELECTRONIC DEVICE HAVING VIRTUAL NAVIGATIONAL INPUT DEVICE, AND ASSOCIATED METHOD

(75) Inventors: Robert Lowles, Waterloo (CA); Jacek S. Idzik, Kenilworth (CA)

(73) Assignee: Research In Motion Limited, Waterloo, Ontario (CA)

( * ) Notice: Subject to any disclaimer, the term of this patent is extended or adjusted under 35 U.S.C. 154(b) by 1153 days.

(21) Appl. No.: 11/300,617

(22) Filed: Dec. 14, 2005

(65) Prior Publication Data

US 2007/0132738 A1    Jun. 14, 2007

(51) Int. Cl.
    *G06F 3/043* (2006.01)
(52) U.S. Cl. ...................................... 345/177
(58) Field of Classification Search .................. 345/173, 345/177; 178/18.01–20.04
    See application file for complete search history.

(56) References Cited

U.S. PATENT DOCUMENTS

| | | | |
|---|---|---|---|
| 5,553,296 A | * | 9/1996 | Forrest et al. ................ 713/323 |
| 5,583,543 A | * | 12/1996 | Takahashi et al. ........... 345/173 |
| 2001/0006006 A1 | * | 7/2001 | Hill .............................. 73/606 |
| 2002/0135570 A1 | * | 9/2002 | Iisaka et al. .................. 345/177 |
| 2004/0133366 A1 | | 7/2004 | Sullivan et al. |
| 2005/0083313 A1 | * | 4/2005 | Hardie-Bick ................. 345/177 |
| 2005/0174338 A1 | | 8/2005 | Ing et al. |
| 2006/0071912 A1 | * | 4/2006 | Hill et al. ..................... 345/173 |

FOREIGN PATENT DOCUMENTS

| | | |
|---|---|---|
| GB | 2 385 125 A | 8/2003 |
| WO | WO 03/067511 A2 | 8/2003 |

* cited by examiner

*Primary Examiner*—Sumati Lefkowitz
*Assistant Examiner*—Robert E Carter, III
(74) *Attorney, Agent, or Firm*—Mukundan Chakrapani; Borden Ladner Gervais LLP

(57) ABSTRACT

An improved handheld electronic device having a virtual navigational input device includes a case, and further includes an input apparatus and a processor apparatus disposed on the case. The processor apparatus executes a routine that compares vibrational results of a contact by a user on the case with reference vibrational results to identify the nature of the contact and to interpret the contact as an input to the processor. The exemplary contact with the case is in the nature of a sliding contact over a series of first features or over a series of second features and can be interpreted as one of more navigational inputs to the processor. The exemplary contact can also be in the nature of a touching or tapping contact or other contact with the case.

20 Claims, 6 Drawing Sheets

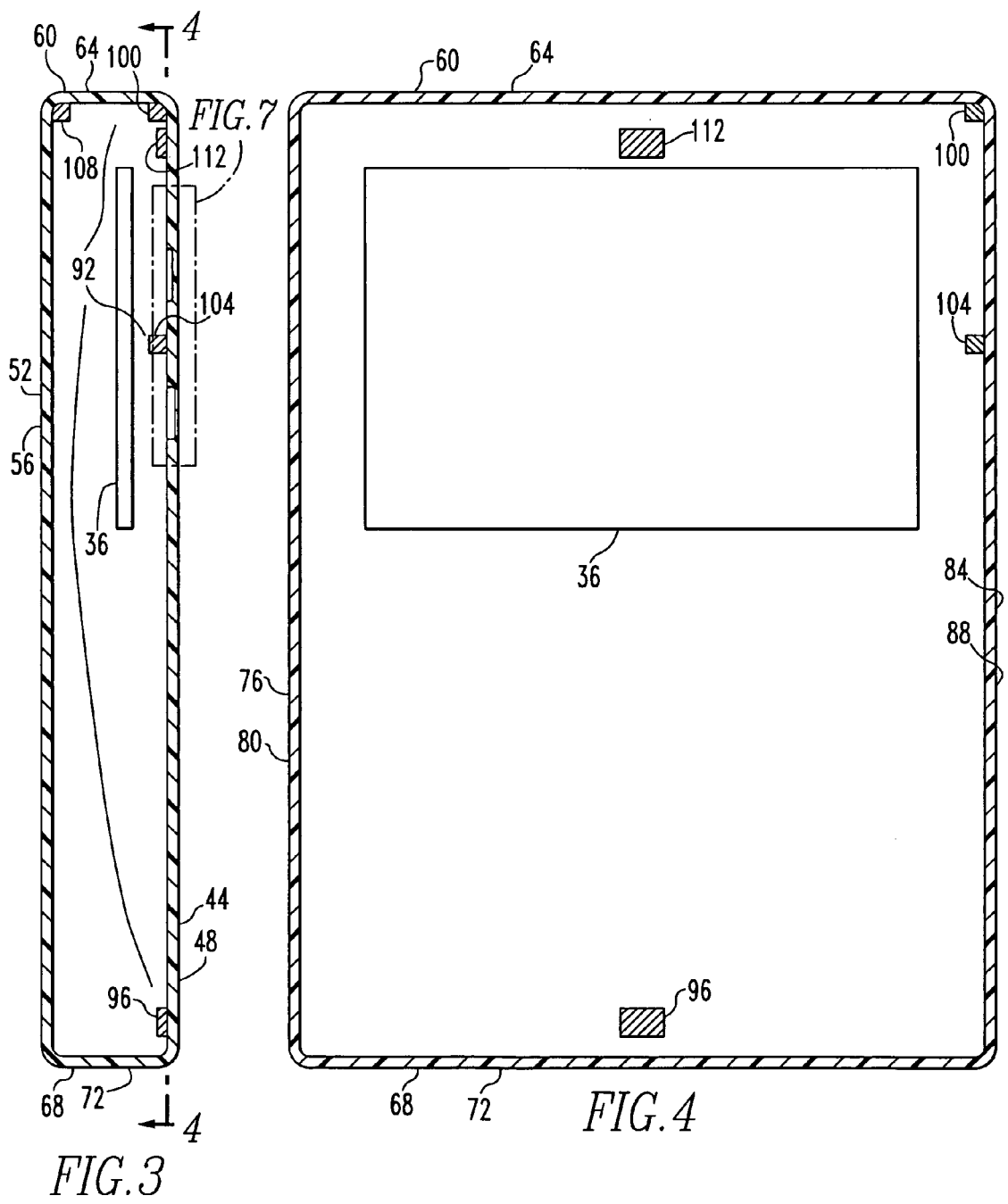

HANDHELD ELECTRONIC DEVICE HAVING VIRTUAL NAVIGATIONAL INPUT DEVICE, AND ASSOCIATED METHOD

BACKGROUND

1. Field

The disclosed and claimed concept relates generally to handheld electronic devices and, more particularly, to an input device of a handheld electronic device.

2. Background

Numerous types of handheld electronic device are known. Examples of such handheld electronic device include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

A typical handheld electronic device might include an input apparatus, a processor apparatus, and an output apparatus, with the input apparatus providing input to the processor apparatus, and with the processor apparatus providing output signals to the output apparatus. Numerous types of input devices are known and would include, for example, keypads, track wheels, touch screens, buttons, microphones, and the like. While such handheld electronic devices have generally been effective for their intended purposes, such handheld electronic devices have not, however, been without limitation.

Many known input devices are of a mechanical nature and thus can add weight and cost to a handheld electronic device, both of which are undesirable in a typical competitive marketplace. Moreover, mechanical input devices increase the complexity of manufacturing such a device, with resultant reduced flexibility in the manufacturing process. Moreover, mechanical input devices are subject to wear and breakage, which can seriously impair the functionality of a handheld electronic device. It thus would be desirable to provide an improved handheld electronic device and an associated method that overcome at least some of these and other limitations.

BRIEF DESCRIPTION OF THE DRAWINGS

A full understanding of the disclosed and claimed concept can be gained from the following Description Of The Preferred Embodiment when read in conjunction with the accompanying drawings in which:

FIG. 3 is a sectional view as taken along line 3-3 of FIG. 1;

FIG. 4 is a sectional view as taken along line 4-4 of FIG. 3;

Similar numerals refer to similar parts throughout the specification.

DESCRIPTION OF THE PREFERRED EMBODIMENT

Figure 1:
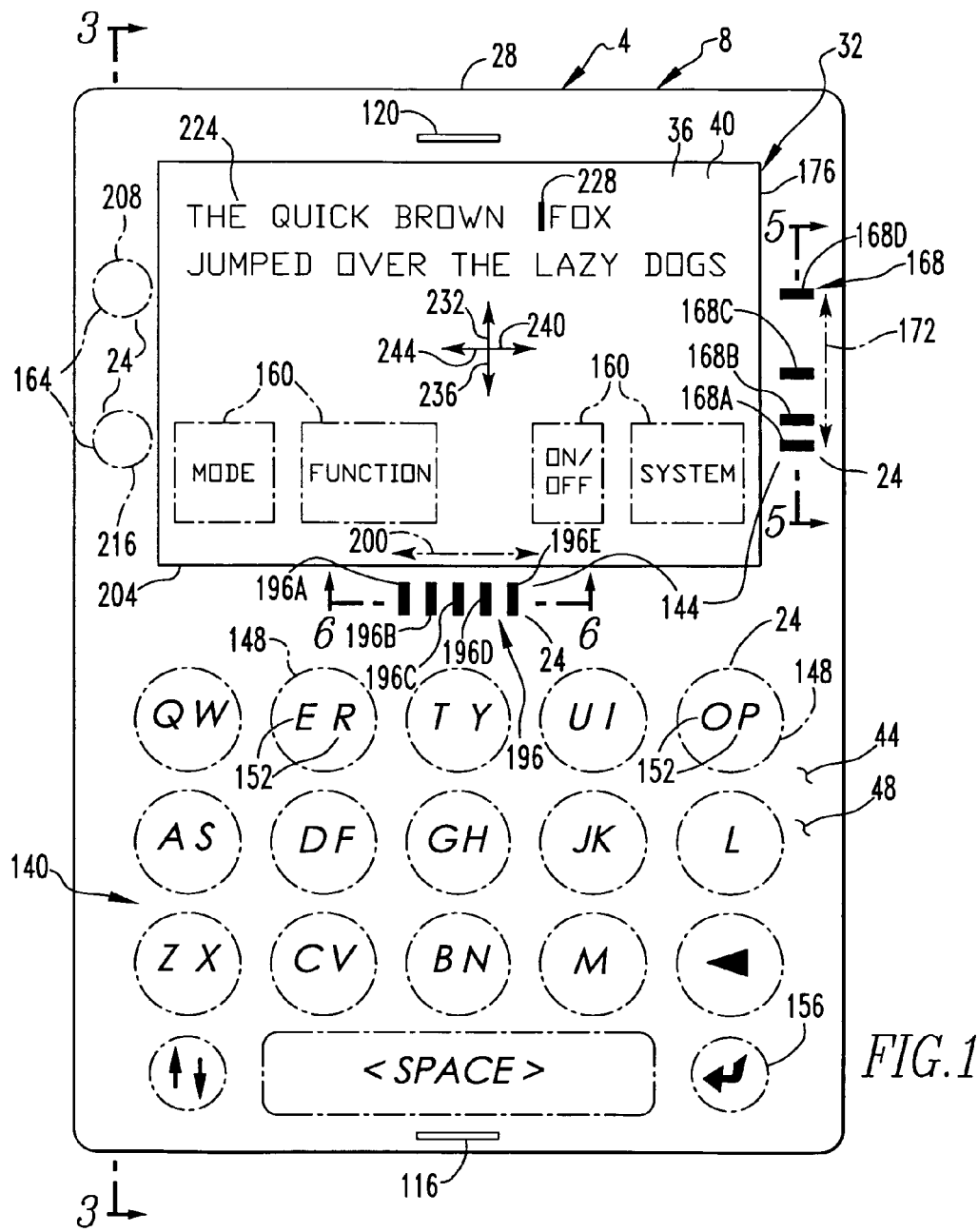
FIG. 1 is a top plan view of an improved handheld electronic device in accordance with the disclosed and claimed concept.
Figure 2:
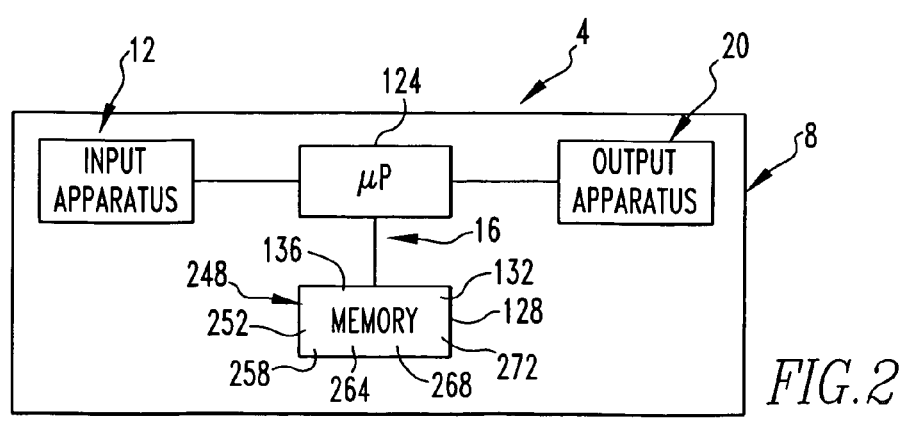
FIG. 2 is a schematic depiction of the improved handheld electronic device of FIG. 1.

An improved handheld electronic device 4 is depicted generally in FIG. 1 and is depicted schematically in FIG. 2. The exemplary handheld electronic device 4 includes a housing 8 upon which are disposed an input apparatus 12, a processor apparatus 16, and an output apparatus 20. The processor apparatus is responsive to input from the input apparatus 12 and provides output signals to the output apparatus 20. The improved handheld electronic device 4 advantageously additionally includes a number of virtual input devices 24 that will be described in greater detail below. As employed herein, the expression "a number of" and variations thereof shall refer broadly to any nonzero quantity, including a quantity of one. Examples of handheld electronic devices are included in U.S. Pat. Nos. 6,452,588 and 6,489,950 which are incorporated by reference herein.

The case 8 includes a housing 28 and a display 32. In the present exemplary embodiment, the display 32 includes a screen 36 and a cover 40. The screen 36 may be any type of visual output device such as an LCD screen or other such device. The cover 40 in the exemplary embodiment depicted herein is a sheet-like piece of transparent material, such as a plastic, that is incorporated into the housing 28. The screen 36 is disposed on structures (not expressly depicted herein) within an interior region of the housing 28. The screen 36 is visible through the cover 40.

As can be understood from FIGS. 1, 3, and 4, the case 8 includes a front wall 44 having a front surface 48, a rear wall 52 having a rear surface 56, a top wall 60 having a top surface 64, a bottom wall 68 having a bottom surface 72, a left wall 76 having a left surface 80, and a right wall 84 having a right surface 88. The front, rear, top, bottom, left, and right walls 44, 52, 60, 68, 76, and 84 can be referred to as peripheral walls that generally enclose the interior region of the housing 28. The front, rear, top, bottom, left, and right surfaces 48, 56, 64, 72, 80, and 88 can generally be said to together form an exterior surface of the handheld electronic device 4. The cover 40 is incorporated into the exemplary front wall 44, and a portion of the front surface 48 extends across the cover 40. The case 8 can be manufactured out of any of a variety of appropriate materials, such as plastics, although other materials may be appropriate without departing from the present concept.

The input apparatus 12 includes a vibrational input system 92 and may include other types of input systems such as radio reception systems and the like. The vibrational input system 92 described herein and depicted generally in FIGS. 1, 3, and 4 includes a microphone 96, a first sensor 100, a second sensor 104, and a third sensor 108. The microphone 96 is an audio transducer than can convert acoustic vibrational energy such as sounds into electrical signals. The first, second, and third sensors 100, 104, and 108 are vibrational sensors which may be, for instance, audio sensors, accelerometers, or types of sensors that detect vibrational energy or activity. As employed herein, the expression "vibrational sensor" and variations thereof shall refer broadly to any type of device that can convert vibrational energy or activity, such as vibrations of a fluid such as air which would include acoustic vibration energy, and vibrations of solids such as would include mechanical vibration energy, into another form such as electrical signals. In the present exemplary embodiment, the first, second, and third sensors 100, 104, and 108 are accelerometers, although other types of vibrational sensors can be employed without departing from the present concept. The microphone 96 is itself a vibrational sensor.

As can be seen more particularly in FIGS. 3 and 4, the first sensor 100 is disposed generally at an intersection between the front, top, and right walls 44, 60, and 84 of the case 8, and the third sensor 108 is disposed at an intersection of the rear, top, and right walls 52, 60, and 84. The second sensor 104 is disposed at an intersection between the front and right walls 44 and 84. The microphone 96 is disposed adjacent an interior surface of the front wall 44. It is noted, however, that the exemplary positioning of the microphone 96 and the first, second, and third sensors 100, 104, and 108 depicted herein is not intended to be limiting.

The output apparatus 20 includes a loudspeaker 112 and can also be said to include the display 32. In this regard, it is understood that the hierarchy of components described herein is not intended to be limiting. The loudspeaker 112 is disposed adjacent an interior surface of the front wall 44. The front wall 44 has formed therein a microphone opening 116 adjacent the microphone 96 and a loudspeaker opening 120 adjacent the loudspeaker 112 in order to enable fluid communication between the microphone 96 and the loudspeaker 112, respectively, and exterior of the handheld electronic device 4.

The processor apparatus 16 includes a processor 124 and a memory 128. The processor 124 can be, for instance and without limitation, a microprocessor (µP) that interfaces with the memory 128. The memory 128 has stored therein at least a first routine 122 that is executable on the processor 124. The memory 128 additionally has stored therein other data such as various stored inputs 136 that could include, for instance and without limitation, textual inputs, functional inputs, navigational inputs, selection inputs, and the like that can be input to the processor 24 in appropriate circumstances. The routine 132 can be in any of a variety of forms such as, without limitation, software, firmware, and the like. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory.

The exemplary virtual input devices 24 mentioned above include, in the present embodiment, a virtual keypad 140 and a virtual navigational input device 144. The virtual keypad 140 and the virtual navigational input device 144 are considered to be "virtual" input devices inasmuch as they do not directly provide input to the processor 124, and rather enable the input apparatus 12 to provide such input.

The virtual keypad 140 includes a plurality of virtual keys disposed at a number of predetermined locations, generally on an exterior surface of the case 8. The virtual keys could, for example, be printed onto the case 8, with any predetermined printed location being the location at which to contact the case 8 if it is desired to provide a corresponding predetermined input 136 to the processor 128.

For instance, and as can be seen in FIG. 1, the virtual keypad 140 includes a plurality of virtual text entry keys 148, many of which comprise one or more exemplary linguistic elements 152, with the linguistic elements 152 being arranged in an exemplary QWERTY arrangement. The exemplary virtual keypad 140 additionally includes a number of virtual functional keys such as a virtual <ENTER> key 156 which can be employed in cooperation with the input apparatus 12 and the processor apparatus 16 to provide a functional input to the processor 124. The exemplary virtual keypad 140 additionally includes a number of virtual soft keys 160 that are depicted as text output on the screen 36. As will be described in greater detail elsewhere herein, the virtual soft keys 160 together provide a virtual touch screen to the handheld electronic device 4. The exemplary virtual keypad 140 can additionally include a number of virtual input keys 164 such as will be described in greater detail elsewhere.

Figure 5:
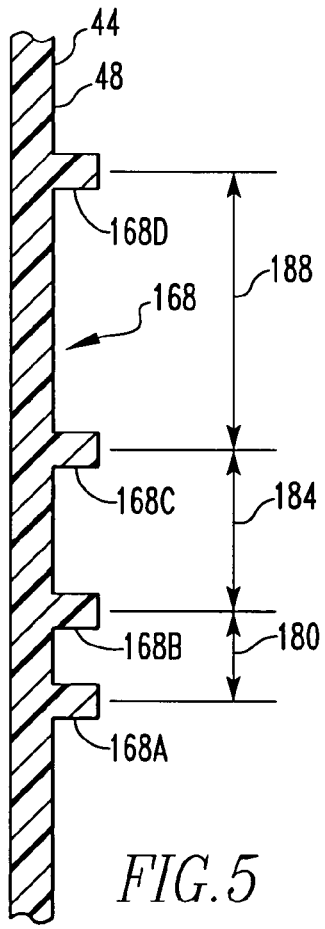
FIG. 5 is a sectional view as taken along line 5-5 of FIG. 1.

As can further be seen in FIG. 1, the exemplary virtual navigational input device 144 includes a series of first features 168 and a series of second features 196 disposed on the front surface 48 of the front wall 44 of the housing 28. As can be seen in FIG. 5, the series of first features 168 includes four first features 168A, 168B, 168C, and 168D that are in the form of protrusions that protrude outwardly from adjacent regions of the front surface 48. The series of first features 168 are spaced apart from one another along a first axis 172 and along a first side 176 of the display 32. In the present exemplary embodiment, the first axis 172 is substantially parallel with the first side 176.

As can be seen in FIG. 5, as adjacent pair of the first features 168A and 168B are spaced apart from one another a first distance 180. Another adjacent pair of the first features 168B and 168C are spaced apart from one another a second distance 184. Another adjacent pair of the first features 168C and 168D are spaced apart from one another a third distance 188. The exemplary first, second, and third distances 180, 184, and 188 are unequal, with the second distance 184 being greater than the first distance 180, and with the third distance 188 being greater than the second distance 184.

Figure 6:
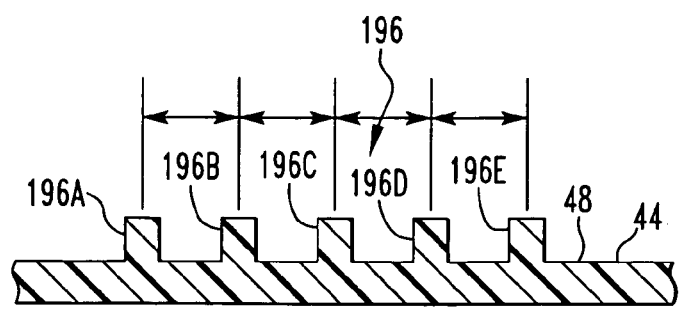
FIG. 6 is a sectional view as taken along line 6-6 of FIG. 1.

As can be seen in FIG. 6, the series of second features 196 includes five exemplary second features 196A, 196B, 196C, 196D, and 196E. The series of second features 196 are protrusions that protrude outwardly from adjacent regions of the front surface 48. The series of second features 196 are spaced apart from one another along a second axis 200 and adjacent a second side 204 of the display 32. In the depicted exemplary embodiment, the second axis 200 is oriented substantially parallel with the second side 204. Also in the depicted exemplary embodiment, adjacent pairs of the second features 196 are spaced apart from one another equal distances.

The exemplary series of first features 168 and the exemplary series of second features 196 are depicted as being protrusions that are integral with the housing 28. It is understood that in other embodiments the first and second features 168 and 196 could be of other configurations without departing from the present concept. For instance, the first and second features 168 and 192 could be in the form of indentations or could be formed of a material having a different coefficient of dynamic friction than the material from which the rest of the case 8 is formed, and the like. As will be described in greater detail elsewhere herein, the first and second features 168 and 192 can be employed to provide, for instance, navigational inputs to the processor 124.

Figure 7:
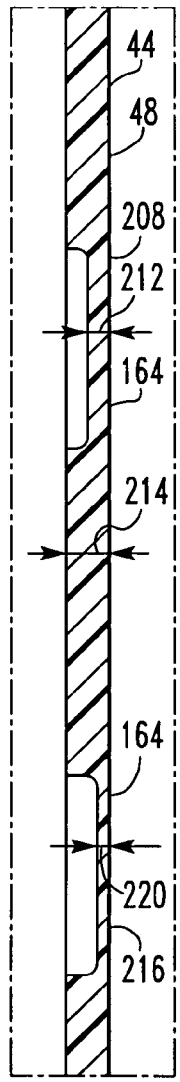
FIG. 7 is an enlarged view of a portion of FIG. 3.

As can be understood from FIGS. 1, 3, and 7, the virtual input keys 164 include a first virtual input key 208 disposed at a first location on the front wall 44 and a second virtual input key 216 disposed at a second location on the front wall 44. The material of the front wall 44 at the first virtual input key 208 is of a first thickness 212 that is different than a nominal housing thickness 214. The first and second virtual input keys 208 and 216 are described in greater detail elsewhere herein.

As a general matter, the virtual input devices 24 can be contacted, such as with a tapping or sliding contact or other contact, as appropriate, to provide vibrational results that can be sensed by the vibrational input system 92 for the purpose of ultimately providing, in appropriate circumstances, one or more inputs 136 to the processor 124. Certain of the inputs 136 can be provided after comparing the sensed vibrational results with reference vibrational results stored in the memory 128. Other inputs 136 can be provided after processing the vibrational results to determine a location on the case 8 where the contact was made and resultantly providing an input 136 that corresponds with the particular location. In certain circumstances, the routine 132 can determine that the vibrational results are to be ignored; which might result in no input 136 resultantly being provided to the processor 124.

As a general matter, however, once a contact is interpreted by the routine 132 as being a desirable contact, i.e., a contact that is desired by the user or is otherwise desirable by the handheld electronic device 4, an input 136 that is stored in the memory 128 and that corresponds with the particular contact is input to the processor 124. In this way, a contact with the handheld electronic device 4 can result in a stored input 136 being input to the processor 124.

As employed herein, the expression "vibrational results" and variations thereof is intended to refer broadly to any kind of vibrational energy or activity that results from a contact with the handheld electronic device and could include, for instance, vibration of a fluid such as air which would include acoustic energy, and vibration of a solid such as the case 8 or other structure of the handheld electronic device 4 which would include mechanical vibration energy.

As employed herein, the expression "contact" and variations thereof shall refer broadly to any type of physical interaction with the handheld electronic device 4, and can include touching, tapping, sliding, impinging air, and the like without limitation, can be done manually, with the us of an implement, and the like, can include both intentional and unintentional events, and can include causing the handheld electronic device 4 to interact with another structure or event.

As can be seen in FIG. 1, the display 32 includes an exemplary textual output 224 in the form of the text "the quick brown fox jumped over the lazy dogs". A cursor 228 is also depicted on the display 32 within the text. As a general matter, the cursor 228 is movable in any one or more of a first direction 232, i.e., north, a second direction 236, i.e., south, a third direction 240, i.e., east, and a fourth direction 244, i.e., west. As a general matter, the cursor is movable in any of the first, second, third, and fourth directions 232, 236, 240, and 244 as a result of one or more navigational inputs, such as one or more of the inputs 136 stored in the memory 128 and input to the processor 124. As indicated elsewhere herein, the series of first features 168 and the series of second features 192 can advantageously be employed to result in the inputting to the processor 124 of such navigational inputs 136.

As further indicated elsewhere herein, a plurality of reference vibrational results 248 are stored in the memory 128. In the present exemplary embodiment, the virtual navigational input device 144, which in the present exemplary embodiment comprises the series of first features 168 and the series of second features 192, is configured to receive sliding contact by a user. Such sliding contact on the first features 168 and/or the second features 192 results in the generation of various vibrational results which can be sensed by the vibrational input system 92. The vibrational results can be compared with one or more of the reference vibrational results 248 stored in the memory 128 to determine which if any of the inputs 136 in the memory 128 should be input to the processor 124.

Figure 8:
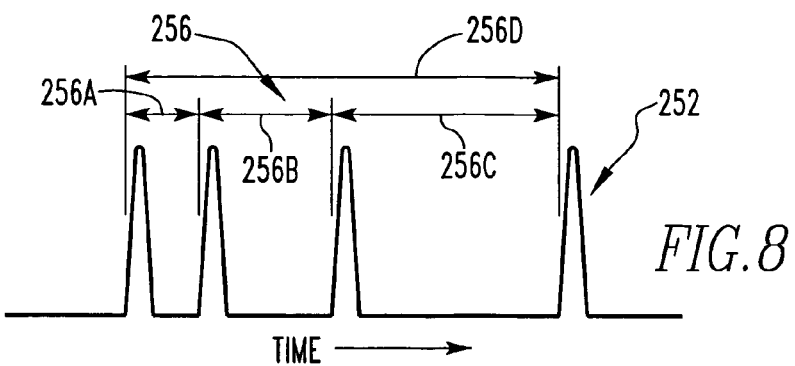
FIG. 8 is a representation of a first exemplary reference vibrational result.
Figure 9:
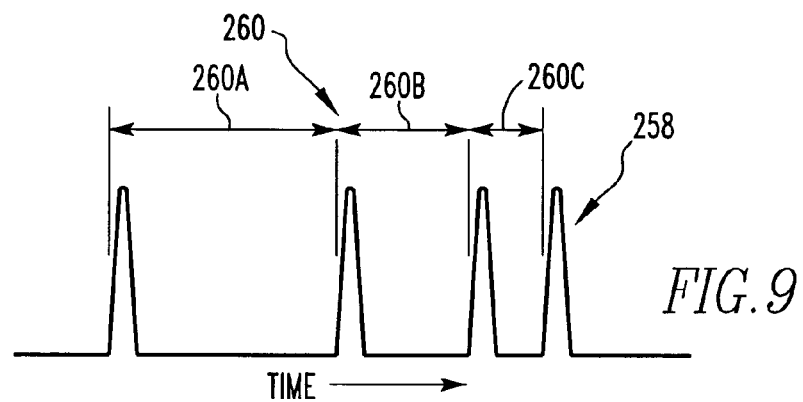
FIG. 9 is representation of a second exemplary reference vibrational result.

For example, the reference vibrational results 248 may include a first reference vibrational result 252, such as is depicted generally in FIG. 8, and which corresponds with at least a first predetermined navigational input 136 in the memory 128. The first reference vibrational result 252 is depicted as comprising a series of vibrational pulses over time, with the vibrational pulses having a first reference temporal distribution 256. Specifically, the chronological first and second pulses are separated by a first time period 256A, the chronological second a third pulses are separated by a second time period 256B, and the chronological third and fourth pulses are separated by a third time period 256C. The exemplary first reference temporal distribution is comprised of the first, second, and third time periods 256A, 256B, and 256C in chronological order. The first reference vibrational result 252 may, for example, correspond with a navigational input in the first direction 232.

The exemplary first reference temporal distribution 236 may also include a first overall time period 256D which can, for instance, be representative of the overall time duration between onset of the first pulse and onset of the fourth pulse. The first overall time period 256D will be described in greater detail elsewhere herein.

The reference vibrational results 248 may additionally include a second reference vibrational result 258 that is stored in the memory 128 and, for instance, that corresponds with a navigational input 136 in the second direction 236. The second reference vibrational result 258 includes a plurality of vibrational pulses having a second reference temporal distribution 260. Specifically, the first and second pulses are separated by a first time period 260A, the second and third pulses are separated by a second time period 260B, the third and fourth pulses are separated by a third time period 260C.

Upon sensing vibrational results of a contact with the handheld electronic device 4, the routine 132 compares a representation of at least some of the vibrational results with at least one of the reference vibrational results 248 stored in the memory 128 to see if the contact can be interpreted as an input 136 to the processor 124 or if the contact should be ignored. For example, the sensed vibrational results may be a sensed series of vibrational pulses which can be compared with either or both of the first and second reference vibrational results 252 and 258 for the purpose of interpreting the intent by the user in making the contact with the handheld electronic device 4. For instance, the temporal distribution of the sensed series of vibrational pulses may be compared with either or both of the first and second referenced temporal distributions 256 and 260 in order to determine which, if either, of a navigational input in the first direction 232 and a navigational input in the second direction 236 was intended by the user. By way of example, the time duration between the sensed first, second, third, and fourth vibrational pulses can be compared with the first, second, and third time periods 256A, 256B, and 256C of the first reference temporal distribution 256, and/or can be compared with the first, second, and third time periods 260A, 260B, and 260C of the second reference temporal distribution 260 to determine which, if either, of the first and second vibrational results 252 and 258 can be said to be consistent with the sensed vibrational results.

The comparison can be performed on any of a variety of bases. For example, the analysis may be based upon determining which of the reference vibrational results 248 to which the sensed vibrational result has the greatest degree of correspondence. In such a circumstance, the input 136 corresponding with the reference vibrational result 248 having the greatest degree of correspondence with the sensed vibrational results will be input to the processor 124. Alternately or additionally, the routine 132 may employ a threshold degree of correspondence between the sensed vibrational results and the reference vibrational result 248, with the threshold having to be met or exceeded before an input 136 is provided to the processor 124. Such a threshold might be usefully employed in determining whether sensed vibrational results should be ignored, such as might occur if the threshold is not met.

For instance, the routine 132 may conclude that the first reference vibrational result 252 has the greatest degree of correspondence with the sensed vibrational results. Since the first reference vibrational result 252 corresponds with a navigational input 136 in the first direction 232, the routine 132 will input to the processor 124 a navigational input 136 in the first direction 232. If the results of a comparison between the sensed vibrational results and the reference vibrational results 248 are inconclusive, the routine 132 may ignore the contact, may display an error message, or may take other appropriate action.

It is noted that the spacing of the first features 168A, 168B, 168C, and 168D allow a ready distinction to be made by the routine 132 between a sliding contact in the upward direction from the perspective of FIG. 5, such as would coincide with the first reference vibrational result 252, and a sliding contact in the downward direction from the perspective of FIG. 5, which would coincide with the second reference vibrational result 258. In this regard, it can be seen that the first reference temporal distribution 256 and the second reference temporal distribution 260 are opposites. That is, the sequence in the first, second, and third time periods 256A, 256B, and 256C, corresponds with the sequence of the third, second, and first time periods 260C, 260B, and 260A, which is the reverse of the chronological order of the first, second, and third time periods 260A, 260B, and 260C in the second reference temporal distribution 260. Advantageously, therefore, a sliding contact in the upward direction from the perspective of FIG. 5 can result in a navigational input 136 in the first direction 232 being input to the processor 124, and a sliding contact in the downward direction from the perspective of FIG. 5 can result in an opposite navigational input, i.e., a navigational input 136 in the second direction 236, being input to the processor 124.

It thus can be seen that the series of first features 168 can be employed by the user by providing a sliding contact thereon to provide navigational inputs 136 in the vertical direction from the perspective of FIG. 1. The routine 132 can additionally tailor the speed and/or distance of the navigational input depending upon the speed with which the sliding contact is made with the series of first features 168. For instance, the first overall time period 256D may be employed to specify a speed and/or distance threshold between a low speed and/or low distance navigational input and a high speed and/or high distance navigational input. That is, if the user makes a relatively quick sliding contact in the upward direction with respect to FIG. 5, the temporal distribution of the sensed vibrational results may have a high degree of correspondence with the first reference temporal distribution 256, which would indicate a navigational input 136 in the first direction 232. If, for example, the sensed time period between initiation of the first sensed vibrational result and initiation of the fourth sensed vibrational result is, for instance, at least one-half of the first overall time period 256D, the resultant navigational input 136 may be performed at a certain speed and/or be of a certain distance. If, on the other hand, the sensed time period between initiation of the first sensed vibrational result and the fourth sensed vibrational result is less than one-half of the first overall time period 256D, for instance, the navigational input 136 may be, for example, at a relatively higher speed or be of a relatively greater distance. This enables both small navigational inputs and large navigational inputs to be provided to the processor 124 depending upon, for instance, the speed of the sliding contact by the user.

The reference vibrational results 248 may additionally include, for example, a third reference vibrational result 264 (FIG. 2) having a reference temporal distribution in the nature of a series of equally spaced vibrational pulses, and might correspond with a navigational input 136 in either the third or fourth directions 240 or 244. The routine 132 potentially could distinguish a sliding contact in the rightward direction from the perspective of FIG. 6, such as would indicate a navigational input in the third direction 240, from a sliding contact in the leftward direction from the perspective of FIG. 6, such as would indicate a navigational input in the fourth direction 244, by, for instance, detecting an increase or a decrease in the amplitude of input. For example, the second sensor 104 may detect a series of vibrational pulses equally spaced in time and having a growing amplitude. The routine 132 may interpret such vibrational results as having a correspondence with the third reference vibrational result 264, indicating a navigational input 136 in either the third direction 240 or the fourth direction 244. The routine 132 may interpret the growing amplitude of the vibrational pulses as being indicative of a sliding contact in the rightward direction from the perspective of FIG. 6, i.e., in a direction generally toward the second sensor 104, which would result in a navigational input 136 in the third direction 240. Other ways of distinguishing between sliding contacts in the rightward and leftward directions from the perspective of FIG. 6 can be envisioned. It is noted, however, that by providing the series of second features 192 with a spacing different than the spacing of the series of first features 168, the routine 132 can distinguish between sliding contacts along the first axis 172 and sliding contacts along the second axis 200.

The reference vibrational results 248 may additionally include a fourth reference vibrational result 268 and a fifth reference vibrational result 272 stored in the memory 128. The fourth and fifth reference vibrational result 268 and 272 might, for instance, be indicative of a tapping contact at the first virtual input key 208 and the second virtual input key 216, respectively. The fourth and fifth reference vibrational results 268 and 272 might, for example, be generally in the nature of a vibrational signature rather than a series of discrete vibrational pulses. This is because the fourth and fifth reference vibrational results 268 and 272 in the present example are reflective of tapping contact at a predetermined location on the handheld electronic device 4 rather than being reflective of sliding contact with a series of spaced features.

As can be best understood from FIG. 7, a tapping contact at the first virtual input key 208 will produce a vibrational result different than the same tapping contact at the second virtual input key 216. This is due, at least in part, to the front wall 44 being of the first thickness 212 at the first virtual input key 208 and being of a second thickness 220 at the second virtual input key 216, with the first and second thicknesses 212 and 220 being different than one another and being different than the nominal housing thickness 214.

Upon detecting a vibrational result of a contact with the handheld electronic device 4, the routine 132 can perform a comparison between the sensed vibrational result and either or both of the fourth and fifth reference vibrational results 268 and 272 in addition to, or as an alternative to, a comparison between the sensed vibrational results and any one or more of the first, second, and third reference vibrational results 256, 258, and 264 or other reference vibrational results 248. In the exemplary embodiment depicted herein, the fourth reference vibrational result 268 corresponds with a selection input 136 stored in the memory 128, and the fifth reference vibrational result 272 corresponds with a functional input 136 stored in the memory 128 such as a silencing input of the type that might be used to silence audible, visual, or vibrational outputs from the handheld electronic device 4.

As indicated above, it is additionally possible for the routine 132 to interpret contacts with the handheld electronic device 4 in a fashion other than by comparing the vibrational results with reference vibrational results 248 that are stored in the memory 128. This can be the situation with the first and second virtual input keys 208 and 216 or other virtual input devices 24.

For instance, the routine 132 may be configured to detect a series of vibrational results that are the result of a contact with the handheld electronic device 4, and to responsively determine the particular location on the case 8 where the contact was made. The particular location of the contact will determine whether the contact will result in an input 136 to the processor 124 or whether the contact is ignored. For instance, if all of the virtual input devices 24 are on the front surface 48 of the case 8, a contact on a surface of the case 8 other than the front surface 48 would be ignored by the routine 132. For example, if a user places the handheld electronic device 4 onto a table, such placement would generate vibrational results that would be sensed by the vibrational input sensor 92. Such vibrational results desirably might be ignored by the routine 132 since a user, in placing the handheld electronic device 4 onto a table, likely did not intend such action to cause an input to the processor 124.

On the other hand, the routine 132 might determine, for instance, that the sensed vibrational results indicate that a tapping contact was made at a location on the front surface 48 that corresponds with the virtual text entry key 48 to which are assigned the letters <OP>. In such an instance, a textual input 136 corresponding with the <OP> key 148 would be provided to the processor 124.

Figure 10:
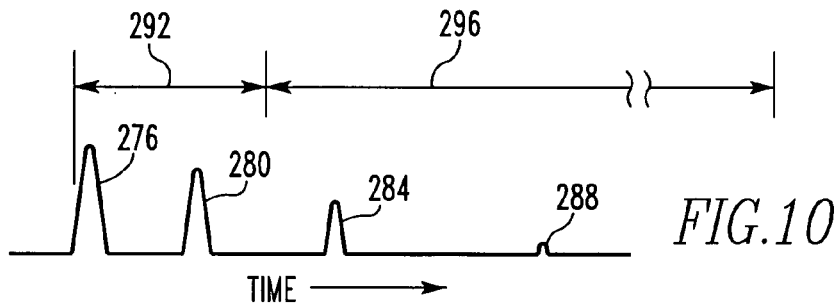
FIG. 10 is a representation of a first exemplary set of vibrational results of a contact with the handheld electronic device of FIG. 1.

Such sensing of vibrational results can occur in a variety of fashions. For instance, and as is depicted generally in FIG. 10, such sensing could occur through the use of a single sensor, such as the first sensor 100, by detecting as the sequence of vibrational results an initial vibrational result and an echo vibrational result. For example, a representation of a series of detected vibrational results is depicted generally in FIG. 10 as including a first vibrational result 276, which is an initial vibrational result of the contact, which is followed by a second vibrational result 280, a third vibrational result 284, and a fourth vibrational result 288. The second, third, and fourth vibrational results 280, 284, and 288 are echo vibrational results. In this regard, when a tapping contact, for instance, is made with the case 8, the initial wave of vibrational energy would radiate in all directions from the location of the contact. The initial wave of vibrational energy thus would travel within and/or through the case 8 toward the first sensor 100, for instance, and be sensed thereby.

As the initial wave of vibrational energy travels from the point of initial contact, the initial wave of vibrational energy will be reflected by and away from one or more of the front, rear, top, bottom, left, and right walls 44, 52, 60, 68, 76, and 84 or other structures. Such reflective vibrational energy would also travel within and/or through the case 8 and would be detected by, for instance, the same first sensor 100 and would result in one or more of the second, third, and fourth vibrational results 280, 284, and 288 which, as mentioned above, are echo vibrational results.

It is noted, however, that reflective vibrational energy can likewise subsequently and repeatedly be reflected by and away from one or more of the front, rear, top, bottom, left, and right walls 44, 52, 60, 68, 76, and 84 or other structures until such reflective vibrational energy becomes attenuated. The sensing of an initial vibrational result and a number of echo vibrational results thus can have a tendency to provide information that can be confusing to the routine 132. It is thus desired to sense and employ only a particular quantity of the vibrational results sensed by the vibrational input system 92. For instance, FIG. 10 indicated that the vibrational results which are sensed by the first sensor 100 within a first period of time 292 after the sensing of an initial vibrational result will be registered, and that additional vibrational results occurring within a second period of time 296 after the first period of time 292 will be ignored by the routine 132.

In the present example, the tapping contact of the case 8 at the location corresponding with the <OP> key 148 resulted in the first, second, third, and fourth vibrational results 276, 280, 284, and 288. However, only the first and second vibrational results 276 and 280 occurred during the first period of time 292. The third and fourth vibrational results 284 and 288 occurred during the second period of time 296, and thus are ignored. The routine 132 can employ known time reversal algorithms and the like to determine the location on the case 8 of the tapping contact in order to provide an appropriate input 136 to the processor 124.

The exemplary first period of time 292 can be, for instance, one-half of a millisecond, and the second period of time can be, for instance, fifty milliseconds. In many handheld electronic devices, the input system is already configured such that, upon detection of an input, the system will ignore additional inputs for a particular period of time such as fifty milliseconds in order to avoid confusing inputs, such as multiple inputs from, for instance, the same key during a single actuation. In the example depicted in FIG. 10 and described herein, such a system would be supplemented by detecting all vibrational results within a first relatively small period of time, i.e., the first period of time 292, and thereafter would ignore additional vibrational results during the second period of time 296. After expiration of the second period of time 296, the routine 132 would again be configured to detect vibrational results, such as the vibrational results of an additional tapping or other contact on the case 8.

Alternatively, the routine 132 may detect the temporal distribution between vibrational results detected from a plurality of sensors. In this situation, the various vibrational sensors typically would each be sensing an initial vibrational result of a contact by the user, with such sensing occurring at different locations within the case 8 in order to determine a location of the contact on the case 8.

Figure 11:
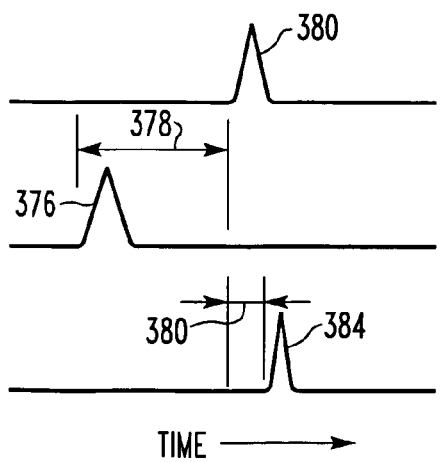
FIG. 11 is a representation of a second exemplary set of vibrational results of a contact with the handheld electronic device of FIG. 1.

For instance, FIG. 11 depicts the exemplary vibrational results of a contact by a user with the front surface 48 at a location corresponding with the <OP> key 148. Specifically, a first vibrational result 376 might be sensed by the second sensor 104. After a first time period 378 a second vibrational result 380 may be sensed by the first sensor 100, and after a second time period 382 after sensing of the second vibrational result 380 a third vibrational result 384 may be detected by the third sensor 108. The use of the first, second, and third sensors 100, 104, and 108 could allow a triangulation, in effect, to be performed to determine the specific location on or within the case 8 of the contact. It is noted, however, that such sensing could be performed by fewer than three vibrational sensor, i.e., such as by using only a pair of vibrational sensors, and that the expression "triangulation" is not intended to require three vibrational sensors.

Figure 12:
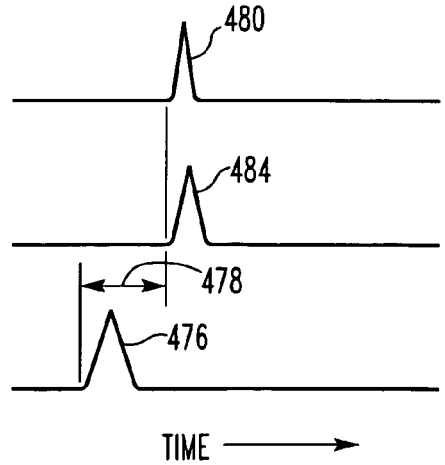
FIG. 12 is a representation of a third exemplary set of vibrational results of a contact with the handheld electronic device of FIG. 1.

Another exemplary vibrational result is depicted generally in FIG. 12. Here, a first vibrational result 476 may be detected at a first time by the third sensor 108. At a first time period 478 thereafter, a second vibrational result 480 may be sensed by the first sensor 100 and a third vibrational result 484 may be sensed by the second sensor 104, with the second and third vibrational result 480 and 484 being detected simultaneously. Such a set of vibrational results might indicate a contact with the rear surface 56, which would be ignored by the routine 132.

It is understood that in other embodiments the microphone 96 and the loudspeaker 112 could be employed as the vibrational sensors of the vibrational input system. In this regard, the loudspeaker 112 would be mechanically relied upon to provide input in addition to providing output. This would enable a device such as a telephone, which typically would already include a microphone and a loudspeaker, to take advantage of virtual input devices generally without the need to add further components such as additional vibrational sensors.

It is further understood that the predetermined locations on the front surface 48 are not limited to locations other than atop the display 32. For instance, FIG. 1 depicts four virtual soft keys 160 having various exemplary textual legends such as "MODE", "FUNCTION", "ON/OFF", AND "SYSTEM" depicted on the display 32. In the present example herein, the virtual soft keys 160 result in a virtual touch screen since the vibrational input system 92 would detect vibrational results of a tapping contact with any of the virtual soft keys and, in appropriate circumstances, would result in an input 136 to the processor 124. The handheld electronic device 4 thus can achieve the same function as a mechanical touch screen without the expense, weight, and potential questions of reliability that would be associated with the use of a mechanical touch screen.

In this regard, it is understood that the display 32 could occupy all or nearly all of the front surface 48 of the handheld electronic device 4 with, for instance, the virtual text entry keys 148 each being in the form of a virtual soft key, i.e., having a predetermined location on the display 32 and having the linguistic elements 152 thereof visually output by the display 32. Such a system would provide a high degree of versatility since various layouts can be selected for the virtual keypad 140, and because different applications could provide different virtual input devices 24. For instance, a text entry routine might provide a set of virtual text entry keys in the form of virtual soft keys 160 on the display 32. Upon entering a calculator mode, for instance, the virtual text entry keys 148 could be replaced with virtual numeric entry keys, all of which would be in the nature of different virtual soft keys 160.

Figure 13:
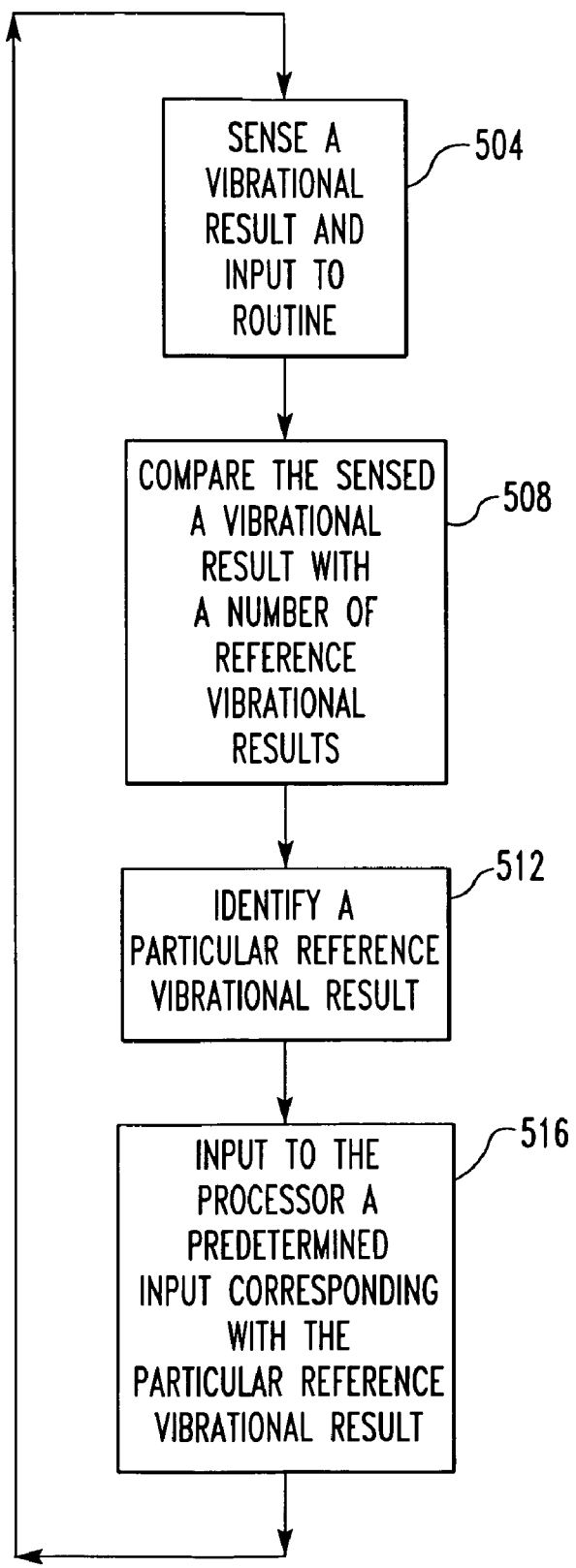
FIG. 13 is an exemplary flow chart depicting certain aspects of an improved method that can be performed on the handheld electronic device of FIG. 1.

An exemplary flow chart depicting certain aspect of the method described herein is depicted generally in FIG. 13. First, and as at 504, the vibrational input system 92 would sense a vibrational result and input the sensed vibrational results to the routine 132. Thereafter, as at 508, the routine would compare the sensed vibrational results with one or more of a number of reference vibrational results 248. At 512 the routine would identify a particular vibrational result 248 as, for instance, either or both of having a greatest degree of correspondence and meeting or exceeding a threshold degree of correspondence with the sensed vibrational results. Thereafter, and as at 516, the routine 132 would input to the processor 124 a predetermined input 136 corresponding with the particular reference vibrational result 248 identified at 512. Processing thereafter continues at 504 where additional vibrational results can be sensed. Although not expressly depicted herein, if a threshold degree of correspondence is employed and is not met at 512, processing could be transferred to 504.

Figure 14:
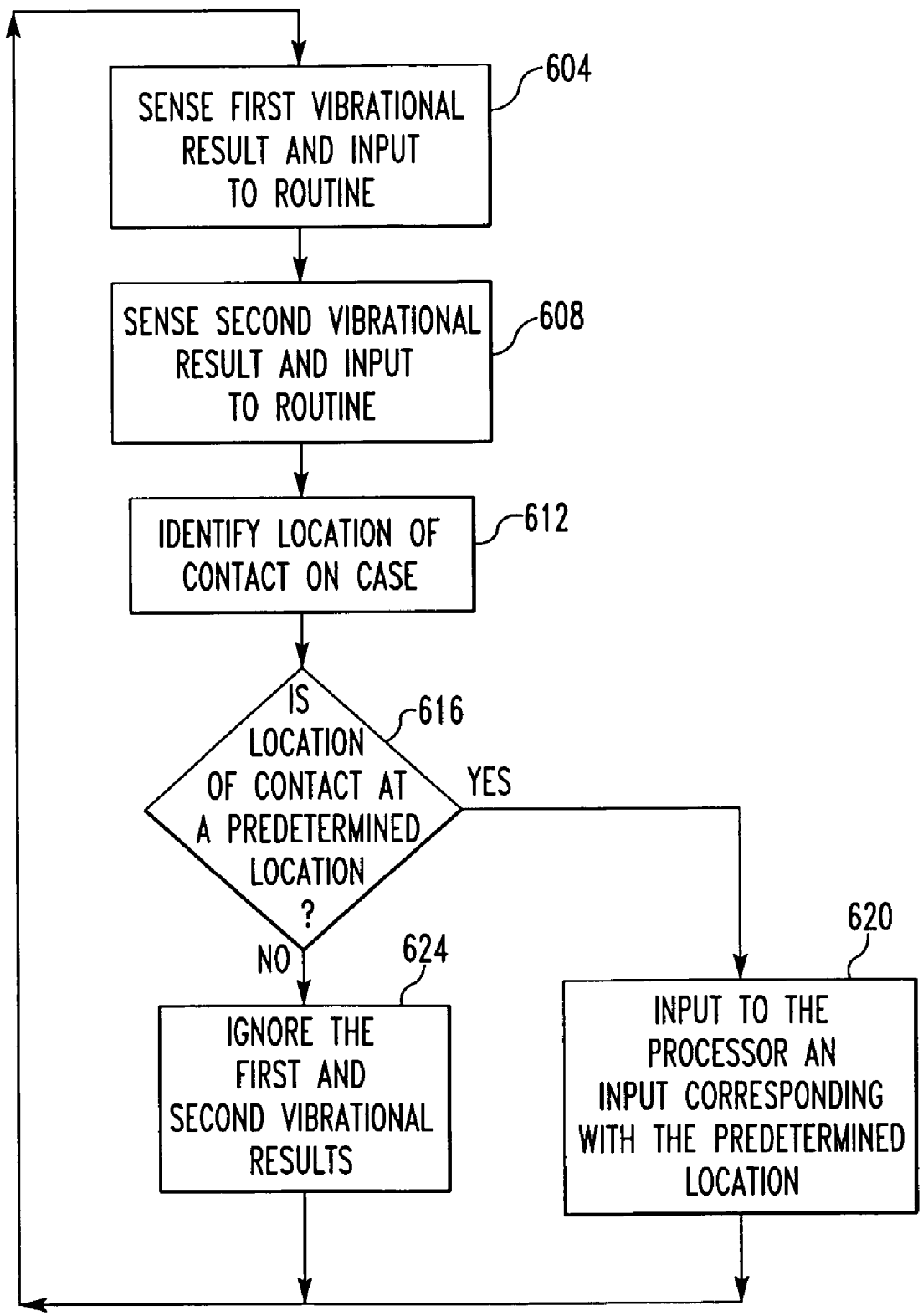
FIG. 14 is another exemplary flow chart depicting certain aspects of an improved method that can be performed on the handheld electronic device of FIG. 1.

Certain aspects of another method depicted herein are illustrated in FIG. 14. At 604, the vibrational input system 92 senses a first vibrational result and inputs the vibrational result to the routine 132. Thereafter, as at 608, the vibrational input system 92 senses a second vibrational result and inputs the second vibrational result to the routine 132. At 612, the routine identifies the location of contact on the case 8. In this regard, and as suggested above, the contact can be either on the housing 28, such as might result in the example of a virtual keypad 140, or can occur on the display 32, such as might occur in the example of a virtual touch screen.

At 616, the routine 132 determines whether the location of contact is at a predetermined location on the case 8. If yes, processing continues to 620 where the routine 132 inputs to the processor 124 an input 136 corresponding with the predetermined location. Processing thereafter continues to 604 where additional vibrational results can be sensed. If, however, at 616 the routine determines that the contact was at other than a predetermined location, processing continues, as at 624, where the routine 132 ignores the first and second vibrational results. Processing thereafter continues to 604 where additional first vibrational results can be detected.

While specific embodiments of the disclosed and claimed concepts have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concepts which is to be given the full breadth of the claims appended and any and all equivalents thereof.

What is claimed is:

1. A method of enabling input into a handheld electronic device of a type comprising a case, an input apparatus, and a processor apparatus, the input apparatus and the processor apparatus being disposed on the case, the input apparatus comprising a vibrational sensor, the processor apparatus comprising a processor and a memory having stored therein at least a first routine that is executable on the processor, the method comprising:

sensing, as a vibrational result of a contact by a user with a surface of the case, a series of vibrational pulses having a temporal distribution;

comparing a representation of at least a portion of the temporal distribution with at least one of a first reference temporal distribution and a second reference temporal distribution, the first reference temporal distribution comprising a first series of vibrational pulses and the second reference temporal distribution comprising a second series of vibrational pulses which is the inverse of the first series of vibrational pulses; and interpreting the contact as an input to the processor.

2. The method of claim 1, further comprising sensing as the vibrational result at least one of an acoustic result of the contact and a vibration of the case resulting from the contact.

3. The method of claim 2, further comprising sensing at least a portion of the acoustic result with a microphone of the input apparatus.

4. The method of claim 2, further comprising sensing at least a portion of the vibration of the case with an accelerometer of the input apparatus.

5. The method of claim 1, further comprising interpreting the contact as one of a first navigational input corresponding with the first reference temporal distribution and a second navigational input corresponding with the second reference temporal distribution, the first and second navigational inputs being directionally opposite one another.

6. The method of claim 1, further comprising interpreting the contact as one of a navigational input in a predetermined direction and another navigational input in the predetermined direction, the navigational input and the another navigational input being different than one another in speed.

7. The method of claim 1, further comprising sensing as the vibrational result a vibrational result of a contact by the user with a series of features disposed on the case.

8. The method of claim 1, further comprising interpreting the contact as a navigational input to the processor.

9. The method of claim 1, further comprising interpreting the contact as an input terminating at least one of an audible output and a visible output.

10. A handheld electronic device comprising:
a case;
an input apparatus disposed on the case and comprising a vibrational sensor structured to sense, as a vibrational result of a contact by a user with a surface of the case, a series of vibrational pulses having a temporal distribution;
an output apparatus; and
a processor apparatus disposed on the case and comprising a processor and a memory having stored therein a routine that is executable on the processor and that is structured to compare a representation of at least a portion of the temporal distribution with at least one of a first reference temporal distribution and a second reference temporal distribution, the first reference temporal distribution comprising a first series of vibrational pulses and the second reference temporal distribution comprising a second series of vibrational pulses which is the inverse of the first series of vibrational pulses, the routine being further structured to interpret the contact as an input to the processor apparatus.

11. The handheld electronic device of claim 10 wherein the memory has stored therein a number of first reference vibrational results representative of a tapping contact by the user with the case and a number of second reference vibrational results representative of a sliding contact by the user with the case.

12. The handheld electronic device of claim 11 wherein the case comprises a series of features disposed thereon, the vibrational sensor being structured to sense the series of vibrational pulses as resulting from the sliding contact by the user with at least some of the features.

13. The handheld electronic device of claim 12 wherein a first adjacent pair of the features are spaced apart a first distance, and wherein a second adjacent pair of the features are spaced apart a second distance, the first and second distances being unequal.

14. The handheld electronic device of claim 12 wherein at least some of the features each comprise a protrusion extending outwardly from an adjacent portion of the case and an indentation extending inwardly from an adjacent portion of the case.

15. The handheld electronic device of claim 10 wherein a first navigational input corresponds with the first reference temporal distribution, and wherein a second navigational input corresponds with the second reference temporal distribution, the first and second navigational inputs being directionally opposite one another.

16. The handheld electronic device of claim 10 wherein the vibrational sensor is a microphone structured to sense as the vibrational result an acoustic result of the contact by the user with the surface of the case.

17. The handheld electronic device of claim 10 wherein the vibrational sensor is an accelerometer structured to sense as the vibrational result a vibration of the case resulting from the contact by the user with the surface of the case.

18. The handheld electronic device of claim 10 wherein the case comprises a housing and a display, the routine being structured to interpret a vibrational result of a sliding contact on the case along a first axis with respect to the display as a navigational input on the display in a direction generally parallel with the first axis, the routine being structured to interpret a vibrational result of a sliding contact on the case along a second axis with respect to the display as a navigational input on the display in a direction generally parallel with the second axis, the first axis and the second axis being nonparallel.

19. The handheld electronic device of claim 10 wherein the case comprises a series of first features disposed thereon and a series of second features disposed thereon, the series of first features being spaced apart from one another along an axis, the series of second features being spaced apart from one another along another axis, the axis and the another axis being nonparallel, the routine being structured to interpret a vibrational result of a sliding contact along at least some of the first features as a navigational input in a first direction on the display, the routine being structured to interpret a vibrational result of a sliding contact along at least some of the second features as a navigational input in a second direction on the display, the first direction and the second direction being different.

20. The handheld electronic device of claim 19 wherein the series of first features are spaced apart from one another along and adjacent a first side of the display, and wherein the series of second features are spaced apart from one another along and adjacent a second side of the display, the first side and the first direction being oriented substantially parallel with one another, the second side and the second direction being oriented substantially parallel with one another.

* * * * *